US005605643A

United States Patent [19]

Reece

[11] Patent Number: 5,605,643

[45] Date of Patent: Feb. 25, 1997

[54] HEATED STEERING WHEEL WITH A PLURALITY OF RADIALLY EXTENDING WIRES FOR AFFORDING SUITABLE HEAT CONDUCTIVITY

[76] Inventor: Mildred D. Reece, Rte. 2, Box 688, Lake Chelan, Wash. 98816

[21] Appl. No.: 576,761

[22] Filed: Dec. 21, 1995

[51] Int. Cl.[6] ................................ B60L 1/02; H05B 3/50

[52] U.S. Cl. .......................... 219/204; 219/535; 219/544; 219/546; 74/552

[58] Field of Search .................................... 219/204, 528, 219/540–542, 544, 535, 546, 549, 548; 74/552, 558, 558.5

[56] References Cited

U.S. PATENT DOCUMENTS

| | | | |
|---|---|---|---|
| 1,388,488 | 8/1921 | Senn | 219/204 |
| 2,014,677 | 9/1935 | Williams | 219/534 |
| 2,662,961 | 12/1953 | Sargent | 219/204 |
| 4,535,221 | 8/1985 | Holsworth | 219/204 |
| 5,072,093 | 12/1991 | Scheuerer | 219/204 |

FOREIGN PATENT DOCUMENTS

| | | | |
|---|---|---|---|
| 61-122069 | 6/1986 | Japan | 219/204 |

*Primary Examiner*—Teresa J. Walberg
*Assistant Examiner*—Raphael Valencia

[57] ABSTRACT

A selectively heatable steering wheel has an electrically activated heating element disposed within a hollow interior of the wheel. The heating element includes an electrically conductive resistance wire for generating heat, a metallic foil sheath positioned around the element so as to provide a desired level of insulation, and a protective plastic sheath disposed around the foil sheath which operates as a protective covering for the foil sheath during an insertion of the sheath within the hollow interior of the wheel. The plastic sheath is provided with improved heat conductive properties through the use of radially directed, through-extending metallic wires which are randomly positioned throughout the sheath and which operate to conduct heat directly from a surface of the heating element to an interior wall surface of the steering wheel's hollow interior.

1 Claim, 3 Drawing Sheets

HEATED STEERING WHEEL WITH A PLURALITY OF RADIALLY EXTENDING WIRES FOR AFFORDING SUITABLE HEAT CONDUCTIVITY

BACKGROUND OF THE INVENTION

1. Field of the Invention

The present invention relates to vehicle steering wheels and more particularly pertains to a heated steering wheel which is provided with improved heat conduction means.

2. Description of the Prior Art

The use of heated steering wheels is known in the prior art. This is evidenced by the granting of a number of patents relating to various functional and structural aspects of such heated steering wheels. However, a review of the known prior art patents relating to heated steering wheels shows that such wheels either utilize heating elements directly embedded within molded steering wheels so as to provide a direct heat conducting function, or in the alternative, insulated heating elements are disposed within hollow interiors provided in the tubular structures of the wheels. These insulated heating elements provide a better degree of heat insulation so as to prevent damage to a steering wheel; however, the provided insulation frequently results in a very slow heating of the wheels, as well as a loss of control of maintaining a desired surface heat. As such, there exists a need for improved insulated conductors which can be disposed within the hollow interior of a steering wheel wherein such insulated conductors would be provided with means for improving heat conduction between the insulated heating element and the steering wheel per se. In this respect, the present invention substantially addresses this need.

SUMMARY OF THE INVENTION

In view of the foregoing disadvantages inherent in the known types of heated steering wheels now present in the prior art, the present invention provides a new heated steering wheel wherein the same can be utilized to safely and controllably heat the exterior surface of a steering wheel in a rapid and efficient manner. As such, the general purpose of the present invention, which will be described subsequently in greater detail, is to provide a heated steering wheel and method which has many of the advantages of the heated steering wheels mentioned heretofore and many additional novel features that result in a heated steering wheel which is not anticipated, rendered obvious, suggested, or even implied by any of the prior art heated steering wheels, either alone or in any combination thereof.

To attain this, the present invention generally comprises a selectively heatable steering wheel which has an electrically activated heating element disposed within a hollow interior of the wheel. The heating element includes an electrically conductive resistance wire for generating heat, a metallic foil sheath positioned around the element so as to provide a desired level of insulation, and a protective plastic sheath disposed around the foil sheath which operates as a protective covering for the foil sheath during an insertion of the sheath within the hollow interior of the wheel. The plastic sheath is provided with improved heat conductive properties through the use of radially directed, through-extending metallic wires which are randomly positioned throughout the sheath and which operate to conduct heat directly from a surface of the heating element to an interior wall surface of the steering wheel's hollow interior.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new heated steering wheel and method which has many of the advantages of the heated steering wheels mentioned heretofore and many novel features that result in a heated steering wheel which is not anticipated, rendered obvious, suggested, or even implied by any of the prior art heated steering wheels, either alone or in any combination thereof.

It is another object of the present invention to provide a new heated steering wheel which may be easily and efficiently manufactured and marketed.

It is a further object of the present invention to provide a new heated steering wheel which is of a durable and reliable construction.

An even further object of the present invention is to provide a new heated steering wheel which is susceptible of a low cost of manufacture with regard to both materials and labor, and which accordingly is then susceptible of low prices of sale to the consuming public, thereby making such heated steering wheel economically available to the buying public.

Still yet another object of the present invention is to provide a new heated steering wheel which provides in the apparatuses and methods of the prior art some of the advantages thereof, while simultaneously overcoming some of the disadvantages normally associated therewith.

Still another object of the present invention is to provide a new and improved heated steering wheel which facilitates the use of improved conduction means whereby heat is more rapidly and efficiently conducted from an enclosed and insulated heating element to an exterior surface of said steering wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF PREFERRED EMBODIMENTS

Figure 1:
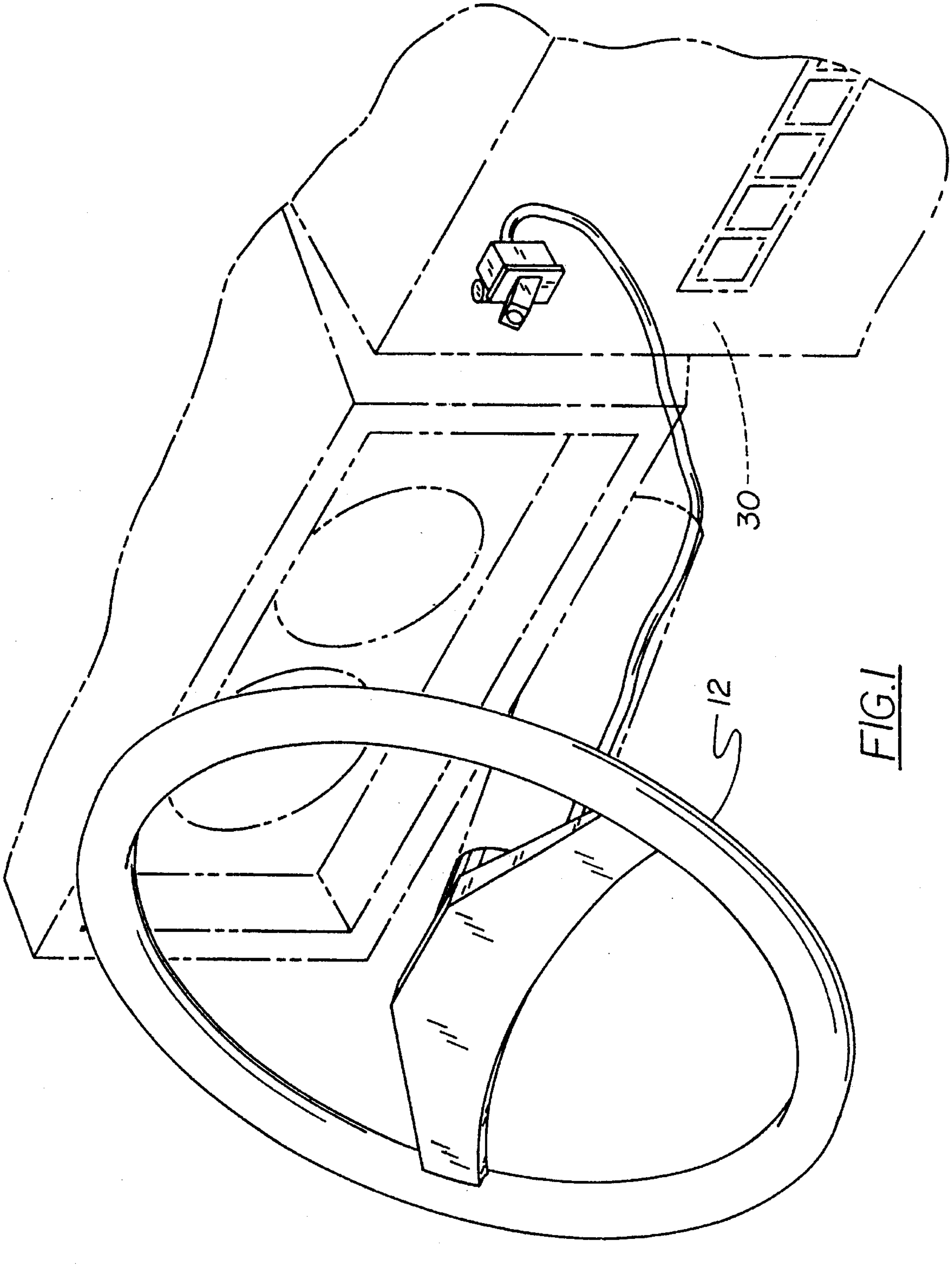
FIG. 1 is a perspective view of the heated steering wheel comprising the present invention.
Figure 2:
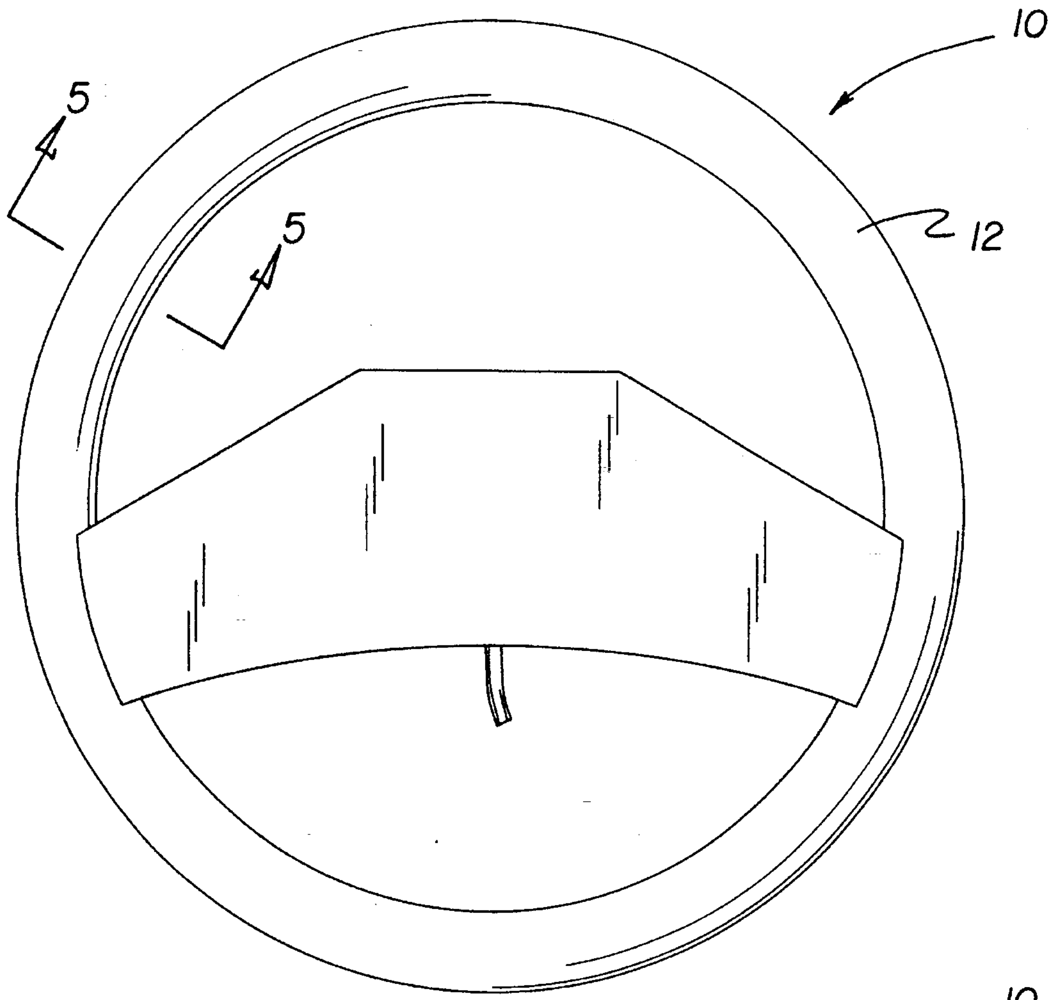
FIG. 2 is a top plan view of the wheel.
Figure 3:
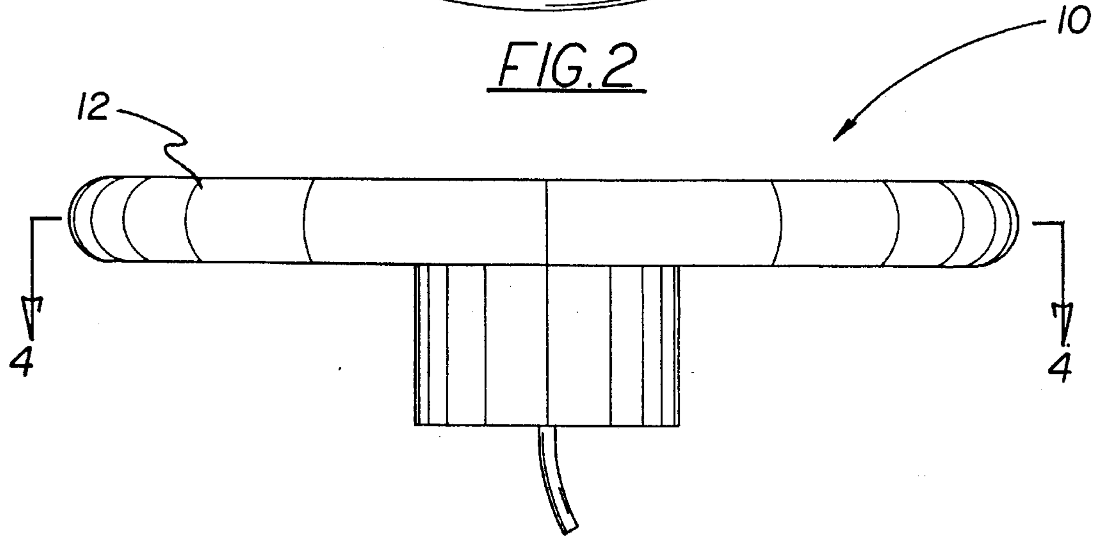
FIG. 3 is a side elevation view of the wheel.

With reference now to the drawings, and in particular to FIGS. 1–5 thereof, a new heated steering wheel embodying the principles and concepts of the present invention and generally designated by the reference numeral 10 will be described.

Figure 4:
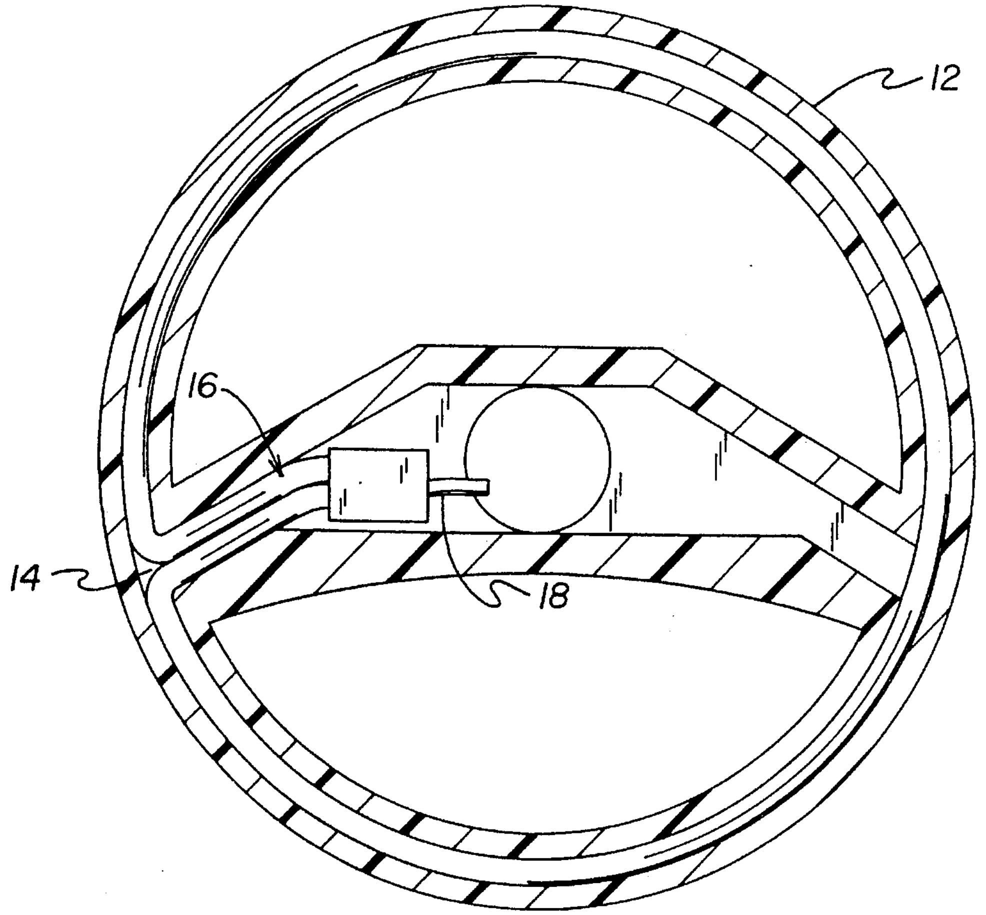
FIG. 4 is a cross-sectional view of the invention as viewed along the line 4—4 of FIG. 3.

More specifically, it will be noted that the heated steering wheel 10 essentially comprises a conventional vehicle steering wheel 12 which can be of any desired shape and dimension and which can be constructed from any known and functionally utilizable material. As best illustrated in FIG. 4, the wheel 12 would desirably be molded from a strong plastic material and would include a peripherally positioned hollow interior which would extend around the entire circumference of the wheel. A heating element 16 could be flexibly positioned within the hollow interior 14 so as to extend around the entire circumference of the wheel, and an electrical supply lead 18 which could be directed to any supply of electrical energy within the vehicle is utilized to activate a resistance heating function of the heating element 16 in a well known and understood manner.

Figure 5:
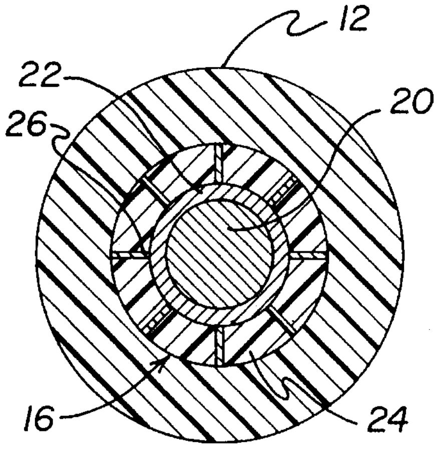
FIG. 5 is a cross-sectional view of the invention as viewed along the line 5—5 of FIG. 2.

As shown in FIG. 5, a novel feature of the present invention resides in the construction and design of the flexible heating element 16. In this respect, there are many examples of similar heated steering wheels in the prior art, and these prior art steering wheels typically are provided with hollow interiors in which heating coils may be selectively disposed. These heating coils also rely on resistance heating from an electrical source, and they may be either insulated or uninsulated. If uninsulated, the danger exists that a particular heating coil might become extremely hot due to a malfunction of a system thermostat or the like, whereby the danger would exist that the associated steering wheel could melt or actually ignite. As to insulated heating coils, the problem exists that such insulation can result in a very slow heat transfer between the heating coil and the steering wheel surface whereby a driver may actually complete his trip before a steering wheel reaches a warm comfortable temperature. Such are the disadvantages of known prior art heating systems for steering wheels.

The present invention overcomes these problems by providing a heating element 16 which includes a heating element 20 having a metallic foil sheath 22 fixedly attached to an exterior surface thereof, and further having a plastic sheath 24 fixedly attached to an exterior surface of the foil sheath 22. The wire core member 20 would most desirably be constructed from copper or aluminum having a high electrical resistance so as to generate heat in a well known manner, and the foil sheath 22 would be of a predetermined thickness so as to act as an insulator for the reasons above-described. The foil sheath 22 would be of a thickness which would prevent steering wheel ignition or damage in the event of electrical supply control failure, and the metallic construction of the foil would still facilitate a rapid heat distribution from the wire core 20 towards an interior wall surface of the hollow interior 14. Inasmuch as a metallic foil sheath 22 could be damaged during insertion within the hollow interior 14 of the wheel 12, the plastic sheath 24 is utilized to prevent such damage and may be adhesively or otherwise fixedly secured to an exterior surface of the foil sheath 22.

The plastic sheath 24 operates as a further insulator between the wire core 20 and the interior wall surface of the wheel's hollow interior 14, and such insulation would be in most cases undesired. This is true due to the fact that plastic is a poor conductor of heat and would substantially slow the rate of heat conduction from the wire core member 20 to the outer surface of the steering wheel 12 under normal circumstances. To overcome this problem, the plastic sheath 24 has a large number of embedded heat conducting wire members 26 disposed therein. This large number of wire members 26 are radially disposed through the plastic sheath 24 so as to be aligned with a center longitudinal axis of the wire core member 20, with each member 26 extending completely through the plastic sheath 24. As such, each metallic member 26 has one end thereof in an abutting relationship with the foil sheath 22 with an opposed end thereof then being abuttable against the interior wall surface of the hollow interior 14. The wire members 26 operate as effective heat conductors from the foil sheath 22 to the wheel 12, thereby increasing the rate of heat transfer from the heating core member 20 to the wheel in a now well understood manner.

Figure 6:
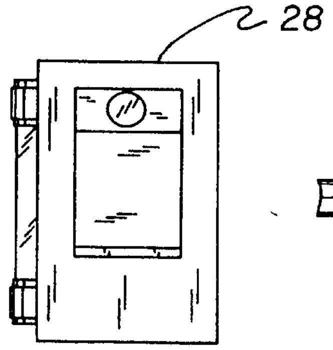
FIG. 6 is a front elevation view of an illuminated switch utilized to operate the invention.
Figure 7:
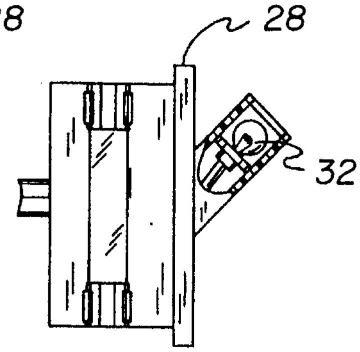
FIG. 7 is a side elevation view of the switch.

The present invention 10 may also utilize a number of conventional devices for controlling the amount of heat deliverable to the steering wheel 12. As shown in FIGS. 6 and 7, an illuminated toggle switch 28 may be mounted on the dashboard 30 of a vehicle as shown in FIG. 1, and this switch is representative of many different types of switches which could be utilized to operate the present invention. While the toggle switch 28 is shown with an illuminable light bulb 32, such illumination is not necessary and in actuality, the switch might more desirably be mounted directly on a rim surface of the steering wheel 12. Similarly, the invention 10 could utilize a thermostatically-controlled switch whereby a driver could desirably dial a desired temperature for the steering wheel 12. As such, all types of controls and switches now known in the prior art are within the intent and purview of the present invention, and are intended to be encompassed by the claims appended hereto.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A heated steering wheel assembly comprising:

a vehicle steering wheel having a hollow interior around a peripheral section thereof;

an elongated heating element comprising a flexible electrically conductive metallic wire composed of metal in the group including copper and aluminum axially disposed within said hollow interior, said elongated heating element adapted to afford resistance heating;

an illuminated toggle switch mounted on a dashboard of a vehicle for controlling the amount of heat deliverable to the steering wheel;

a flexible metallic foil sheath disposed around an exterior surface of said elongated heating element and fixedly attached thereto, said sheath acting as an insulator to control a level of heat dissipation from said heating element to an exterior surface of said steering wheel;

a protective plastic sheath disposed around an exterior surface of said foil sheath and fixedly attached thereto to protect said foil sheath from damage during a positioning of said foil sheath in said hollow interior, wherein the plastic sheath is provided with a large number of substantially straight heat conducting wires randomly disposed within said plastic sheath and directed from an interior surface of the plastic sheath to an exterior surface of the plastic sheath to facilitate heat transfer through said plastic sheath from said heating element;.

wherein said large number of heat conducting wires on said exterior surface of said plastic sheath are in heat conducting contact with a wall surface of said hollow interior of said steering wheel and further are radially aligned relative a center longitudinal axis of said heating element thereby to provide a minimum distance for heat transfer from said heating element through said plastic sheath to said wall surface of said hollow interior.

* * * * *